(12) United States Patent
Sobel (10) Patent No.: US 7,117,080 B2
(45) Date of Patent: Oct. 3, 2006

(54) METHOD TO DETERMINE TDC IN AN INTERNAL COMBUSTION ENGINE

(75) Inventor: Jarl R. Sobel, Västerås (SE)

(73) Assignee: ABB AB, Västerås (SE)

( * ) Notice: Subject to any disclaimer, the term of this patent is extended or adjusted under 35 U.S.C. 154(b) by 0 days.

(21) Appl. No.: 10/480,585

(22) PCT Filed: Jun. 6, 2002

(86) PCT No.: PCT/SE02/01097

§ 371 (c)(1),
(2), (4) Date: Dec. 12, 2003

(87) PCT Pub. No.: WO02/101220

PCT Pub. Date: Dec. 19, 2002

(65) Prior Publication Data

US 2004/0236496 A1    Nov. 25, 2004

(30) Foreign Application Priority Data

Jun. 13, 2001    (SE)    .................................... 0102115

(51) Int. Cl.
*G01M 15/08*    (2006.01)
(52) U.S. Cl. .................... 701/114; 73/115; 73/116
(58) Field of Classification Search ................ 701/100, 701/101, 103, 102, 114; 73/116, 117.2, 117.3, 73/115
See application file for complete search history.

(56) References Cited

U.S. PATENT DOCUMENTS

| | | | |
|---|---|---|---|
| 4,633,707 A | 1/1987 | Haddox | |
| 4,718,382 A | 1/1988 | Tanaka | |
| 4,739,649 A | 4/1988 | Tanaka | |
| 4,898,025 A | 2/1990 | Weyland | |
| 5,101,788 A | 4/1992 | Demizu et al. | |
| 5,107,813 A | 4/1992 | Inoue et al. | |
| 5,261,366 A * | 11/1993 | Regueiro | 123/299 |
| 5,359,883 A | 11/1994 | Baldwin et al. | |
| 5,771,483 A * | 6/1998 | Moine et al. | 701/110 |
| 6,367,317 B1 * | 4/2002 | Jaye | 73/116 |

FOREIGN PATENT DOCUMENTS

| | | |
|---|---|---|
| EP | 0199431 | 10/1986 |
| EP | 0742359 | 11/1996 |
| JP | 9329049 | 12/1997 |

* cited by examiner

*Primary Examiner*—Andrew M. Dolinar
*Assistant Examiner*—Johnny H. Hoang
(74) *Attorney, Agent, or Firm*—Venable LLP; Eric J. Franklin (57) ABSTRACT

A method and apparatus for accurately determining TDC in a cylinder of an internal combustion engine. Gas pressure is measured in the cylinder relative to crank angle, giving rise to a curve of gas pressure with crank angle. An offset is found by first computing the angular position of an inflexion point of the compression pressure curve measured as a function of the crank angle, and then computing the offset as the difference between the angular position of a piston in the cylinder and a theoretical value for said angular position of the piston dependent on a known or measured flywheel angle. The value of TDC corrected by the offset is then used to calculate a value of work output such as the Indicated Mean Effective Pressure (IMEP) which may be used for diagnostic and/or control purposes.

29 Claims, 4 Drawing Sheets

METHOD TO DETERMINE TDC IN AN INTERNAL COMBUSTION ENGINE

TECHNICAL AREA

The present invention concerns the technical area of methods to calculate variables useful in performing diagnostics and control of a combustion engine, such as the Indicated Mean Effective Pressure (IMEP), and other variables which require that the crank angle of the piston in the cylinder is accurately known. In particular the invention concerns a method to determine accurately when a piston in a cylinder of an internal combustion engine is at top dead centre (TDC).

TECHNICAL BACKGROUND

Many methods exist for controlling operation of a combustion engine. In particular, measurements of pressure from one or more cylinders of an engine are commonly used as a basis for engine performance measurement, monitoring and for control of an engine.

One area of use for continually measuring pressure sensors is in very large combustion engines which are operated at relatively low revolutions per minute. Such motors are used for example as ships engines and as stationary engines for driving electrical generators and gas compressors. However engine monitoring and control is also increasingly applied to smaller engines of the type such as those used in ordinary vehicles such as cars, trucks and buses.

Because of the growing demands for reduced consumption of fuel and continually increasing environmental demands on the chemical composition of exhaust gases the requirement to monitor the operation of combustion engines has increased. Misfiring influences exhaust gas chemical composition and can also negatively influence the working life of a combustion engine. With the help of continuous measurement misfiring and other factors affecting engine performance can be detected and action be taken to ensure proper functioning is regained.

A difficulty in the calculation of work output, IMEP of a cylinder is to determine accurately a crank angle for a piston together with the pressure corresponding to that crank angle. Generally crank angle of a given piston is calculated from a measurement of the angular position of the crankshaft of the engine (crankshaft angle), as it is difficult to measure the piston position directly in the cylinder during operation. The crankshaft angle is usually obtained by an independent measurement of the angular position of the flywheel (flywheel angle) relative to a known position such as a timing mark, according to known methods.

Top dead centre (TDC) of a piston in a cylinder may be determined mechanically according to known methods by measuring with, for example, a capacitive sensor or a position transducer in an engine at rest. Another method includes shutting off fuel to a given cylinder of a motor during operation, measuring the cylinder pressure, and estimating the position of TDC in that cylinder from an expected symmetry of the measured pressure curve. In this method a maximum of the symmetrical pressure curve indicates TDC, although that indicated maximum point may contain thermodynamical errors. A principal disadvantage with both of these methods is that they do not provide for determination of TDC in a motor under normal operation.

A method and apparatus described in JP 9329049 discloses that a value for IMEP may be calculated dependent on measured cylinder pressure and known crankshaft angle, and that such a value may be used for control or regulation of fuel supply amount and ignition timing for a motor vehicle engine.

What is difficult in practice with most methods described is to determine accurately an angular offset that usually exists between the flywheel angle and the piston crank angle at a given moment in a revolution. In order to determine the offset it is usually considered sufficient to determine the flywheel angle in relation to a known position of the piston in the cylinder, and the position commonly used is the top dead centre position in the cylinder. The TDC position corresponds to a crank angle for a piston of 0 degrees.

However, the usual methods rely on a measurement based on a point marked at the periphery of the flywheel, which measurement typically depends on a position of a train of mechanically connected engine components in an engine at rest.

For instance in EP 742 359 A2, a method and apparatus for controlling the operation of an internal combustion engine is described. In this description the crankshaft angle is measured by a sensor detecting gear teeth on a ring gear fixed to the flywheel of an engine.

However manufacturing tolerances of engine parts mean in practice that dimensions of parts vary somewhat from specified or expected dimensions. In addition in an engine under operation the dynamic interplay of stresses on components, free play clearances between mechanically connected components, friction and inertia of components means that the mechanical distances and relationships between components under operation may not be the same as distances and relationships between the same components at rest. The relative position of mechanically connected piston and a flywheel at rest does not provide a measurement of the relative position of the same piston and flywheel, as a basis for a computation of the crank angle during operation of an engine, to a degree which is sufficiently accurate for modern engine diagnostic systems or engine control systems.

SUMMARY OF THE INVENTION

It is an object of the invention to provide an accurate determination of position of a piston in a cylinder of an internal combustion engine, a position such as TDC, under normal operation of the engine.

Embodiments of the present invention aim to address one or several of the above mentioned problems. According to one aspect of the invention a method is provided for producing information about the position of a piston in a cylinder with respect to crankshaft angle by measuring gas pressure in the cylinder with respect to crankshaft angle and computing an inflexion point in a curve of gas pressure against crankshaft angle. The position given by the computed inflexion point is compared to the position obtained by a theoretical calculation based on a known or measured flywheel or crankshaft angle, and an offset found. The offset is then used to calculate an accurate value for piston position such as TDC and to compute variables such as IMEP.

In another aspect of the invention a system is provided to determine a position of a piston in a cylinder, including a gas pressure sensor and a computation means suitably arranged to measure gas pressure in a cylinder with respect to a crankshaft angle of a motor, compute an inflexion point of a curve of gas pressure with respect to crankshaft angle and provide an offset representing the difference between piston position determined by the computed inflexion point and piston position calculated according to a known or measured crankshaft angle.

The present invention is directed to determining a point of inflection in a curve from a measurement of cylinder gas pressure and crankshaft angle, that is, the point at which a derivative of the pressure curve with respect to crankshaft angle is at a maximum, or equivalently where the second derivative is equal to zero. The same angular position may also be computed theoretically, by applying well known thermodynamic equations together with data for the heat capacities of the constituent gases taking part in the compression. By comparing the measured value with the theoretical value, the difference or offset between the measured angular position and theoretical angular position of the crankshaft or the flywheel, is obtained and used to calculate the piston position accurately with respect to TDC (or crankshaft angle). Having accurately determined the local crank angle for each piston this value, together with cylinder pressure, may be further used to calculate a measure of work output such as IMEP for each cylinder of an engine.

In another embodiment of the invention, IMEP can be calculated with reduced accuracy without the need for an independent measurement of the flywheel angle. In this embodiment the pressure signal is digitally sampled at known sample times. The derivative of the pressure signal is then computed with respect to time, which is proportional to the derivative with respect to the flywheel angle, if the rotational speed is constant. The timing of the inflection points thus computed for all cylinders where the pressure is measured, is then used together with the known geometry of the crank shaft to estimate the flywheel position at the sample times. This estimated flywheel position is then used to compute local crank angles for the pistons at the sample times, and used together with the sampled pressure signals to compute variables for use as engine diagnostics, such as IMEP.

In another aspect of the invention, a computer program product is provided to carry out the steps of a method according to the invention.

The advantage of using the angular position of the inflexion point of the pressure as a function of the crankshaft angle as the reference point, compared with simply using the angular position of the maximum of the pressure according to the state of the art, is that the inflexion point can be detected during normal operation of the engine. During normal operation the fuel is normally injected at, or slightly ahead of TDC. The maximum of the compression curve is then obliterated by the ignition of the fuel. Another advantage gained by using the angular position of the inflexion point is that it is virtually independent of the value of the pressure at the start of the compression, and only weakly dependent on other well known geometrical and thermodynamic quantities. Its value can therefore be computed theoretically with great accuracy.

The main advantage of the invention is that TDC is determined more accurately with a method and apparatus that is also economic to apply. This means that sophisticated engine diagnostics, control and regulation may be applied to smaller, less expensive engines and not only engines in larger installations such as generators. These benefits can be gained both by more effective development of new or improved engines and from more effective management of engines under operation. The invention consequently offers significant environmental benefits due to reduced fuel consumption and emissions with reduced environmental impact without high investment in engine technology or measurement costs.

Another advantage of one embodiment of the invention is that only one input is required, an input dependent on gas pressure in a cylinder, in order to calculate IMEP according to the invention. Thus with fewer components the system is potentially less prone to breakdowns. In addition, a TDC position of the piston in a cylinder of an internal combustion engine is determined with greater accuracy than existing methods. It is also advantageous that another embodiment of the invention provides a means for determining crank angle that is independent of measurement of the flywheel angle.

The invention may be applied very widely to any motor, old or new, that can be fitted with a sensor for gas pressure for at least one cylinder. In an advantageous embodiment, the invention may be used to provide an input for an engine control or management device or system so that the engine can be monitored and/or regulated. The calculation elements of the method may be carried out by one or more inexpensive electronic components installed in a vehicle such that the results may advantageously be used to control fuel economy and exhaust emission quality.

BRIEF DESCRIPTION OF THE FIGURES

A more complete understanding of the method and apparatus of the present invention may be had by reference to the following detailed description when taken in conjunction with the accompanying drawings wherein.

DESCRIPTION OF EMBODIMENTS

In order to determine a Top Dead Centre position of the piston in a cylinder the present invention comprises a method for determining a point of inflection in a curve dependent on a measurement of cylinder pressure related to crank angle. That is, the point in the pressure curve at which a derivative of the pressure curve in relation to crank angle is at a maximum or equivalent, and where a second derivative of the pressure curve is equal to zero.

Figure 1:
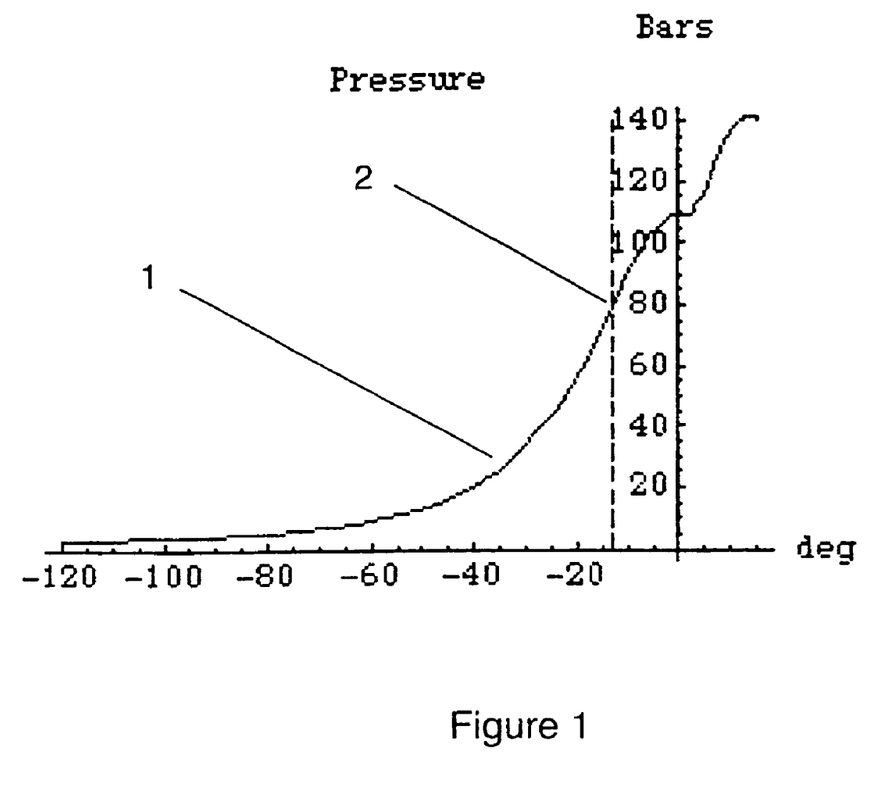
FIG. 1 shows a schematic curve of a relation between gas pressure in a cylinder and crank angle for a method according to an embodiment of the present invention.

FIG. 1 shows a schematic graph of a curve 1 for measured cylinder pressure on the y-axis plotted against crank angle in degrees on the x-axis. A first point of inflection 2 may be seen at about −13° on the curve.

The position of that point $\alpha$ (in radians) may be determined theoretically with the help of a fairly complicated formula as follows:

$$\alpha = -$$

$$\sqrt{\frac{4}{(1+\lambda)(1+2(\gamma-0.0217))(r_c-1)} + \frac{\frac{4}{3}(-1-3\lambda+3\lambda^2)(5+4(\gamma-0.0217))}{(1+\lambda)^2(1+2(\gamma-0.0217))^3(r_c-1)^2}}$$

where
- λ=Relation between crank radius and piston connecting rod length.
- γ=Quotient between heat capacity at constant pressure and heat capacity at constant volume (polytropic coefficient) for the compressed gas at the estimated temperature of the gas at the inflection point.
- $r_c$=Compression ratio of the motor.
- α=theoretical inflexion point in radians.

The dependency of γ means that it is necessary to know about the composition of the compressed gas and its temperature in order for a value for quotient γ to be calculated. The dependency of γ is, as it happens, not particularly great. γ is equal to 1.40 for an ideal gas and remains almost always in within an interval of 1.30–1.40 for real gases. An uncertainty in the value of γ of 0.01 units gives an uncertainty of about 0.03° in the theoretically determined inflection point.

The dependency of other parameters is also moderate. An error in determination of compression ratio of the motor of 1% would give an error in determination of the inflection point according to the above equation of about 0.07°.

Thermal conductivity between the compressed gas and the cylinder wall changes the measured value of the pressure curve somewhat. The maximum pressure is reduced and the curve is shifted to the left compared to FIG. 1 by a value of the order of 0–0.3°. A correction term for this effect has also been calculated within the embodiments of the invention, however it is necessary that the coefficient of thermal conductivity and cylinder wall temperature are both known, which in most cases is only approximately so. Thus a value for position of TDC given in radians may be accurately determined under normal operation of a motor by the described method. Once the crank angle has been determined, the IMEP is readily calculated.

Figure 2:
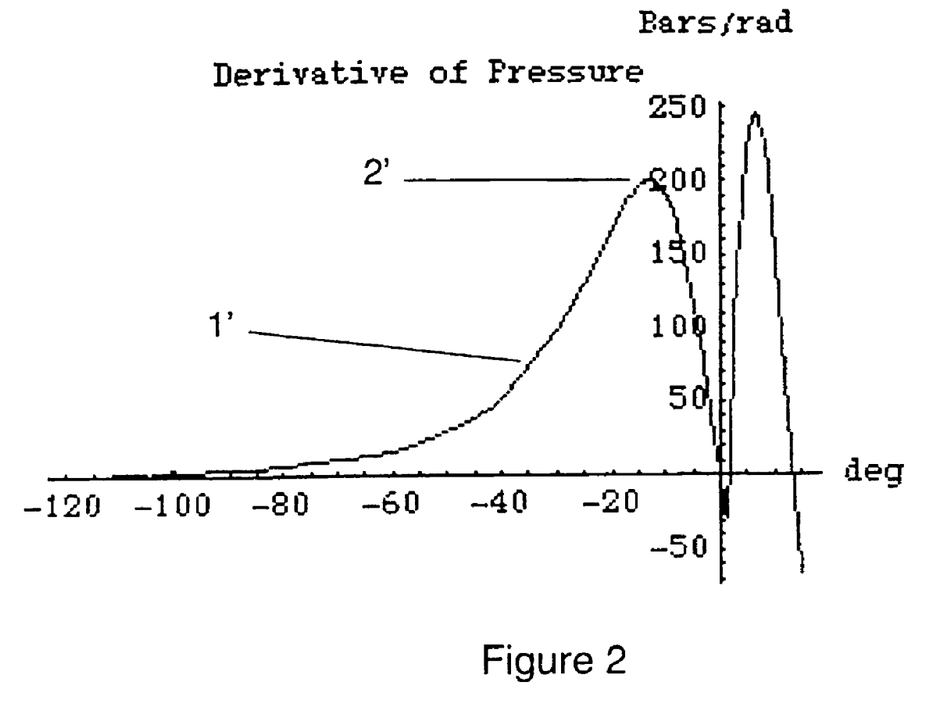
FIG. 2 shows a schematic curve of derivative of a relation between gas pressure in a cylinder and crank angle according to an embodiment of the invention.

FIG. 2. shows a derivative of the pressure/crank angle graph of FIG. 1. The maximum 2' point on the curve 1' is the derivative of the corresponding inflection point 2 on curve 1 shown in FIG. 1. By calculating the derivative, the inflection point 2 may be clearly identified in the curve of FIG. 2 as a maximum.

Figure 3:
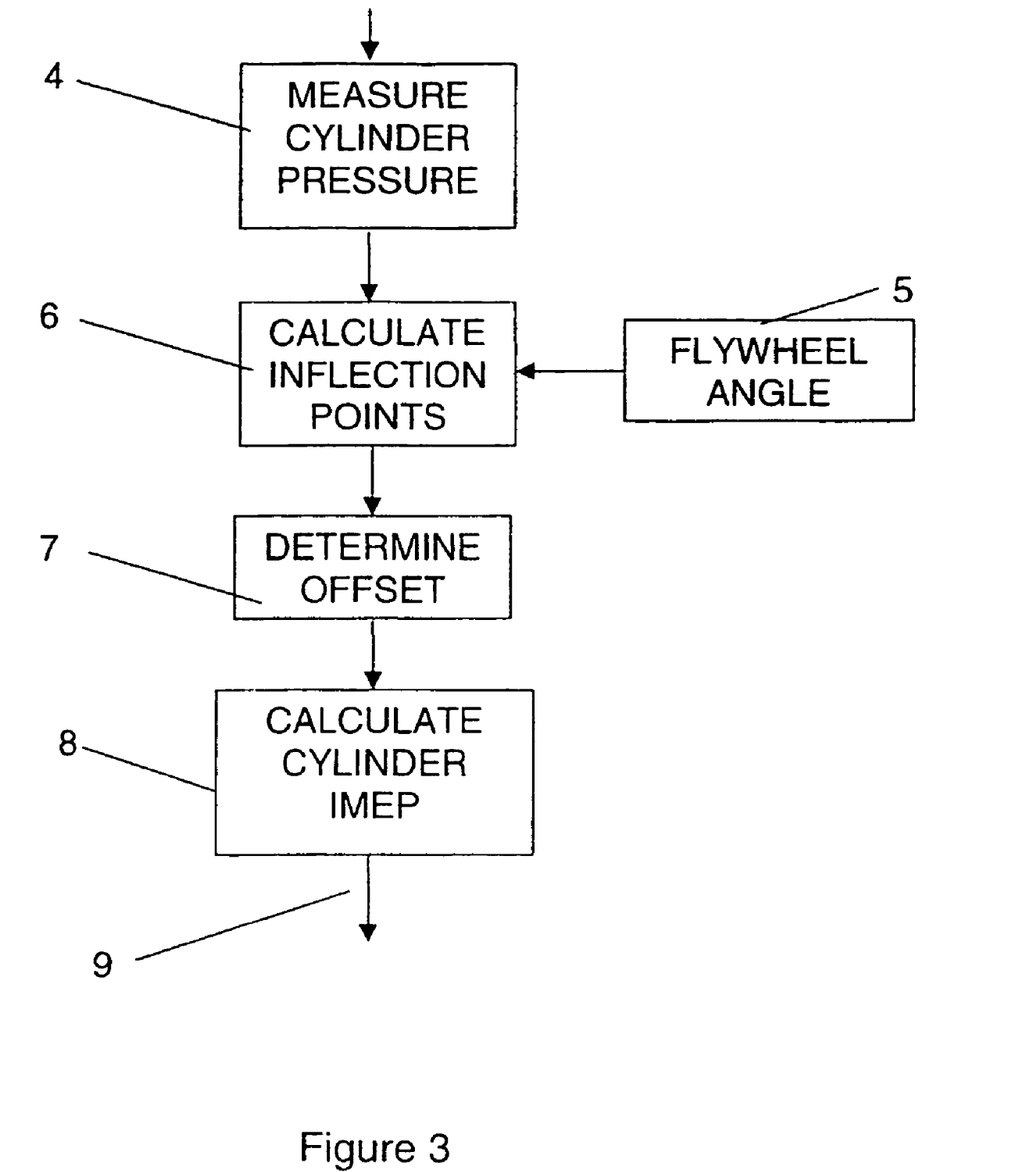
FIG. 3 shows a block diagram of a flow chart for a method to determine an offset between an expected position of piston relative to a measured flywheel angle and a position of the piston relative the flywheel angle computed according to an embodiment of the invention.

FIG. 3 an exemplary flowchart for a method according to an embodiment of the invention is shown. Gas pressure in the cylinder is measured, preferably continually, at 4, using any kind of sensor or measurement means. The flywheel angle is known or measured and made available to a calculation process 6 from a source 5 such as a position sensor. Inflection points and derivatives of the cylinder pressure/angular position curve are calculated at 6. The offset between the expected or theoretical position of a piston according to the known or measured angular position of the flywheel and the actual local crank angle of the piston is determined at step 7. In a further development of the invention a value for the IMEP for the cylinder is calculated at step 8.

The calculated value of IMEP for a cylinder is then available for use as an input to diagnostic and control methods for an engine. The IMEP of each cylinder of a multi-cylinder engine maybe calculated in this way. This result may be used in development of new engines, improvement to existing engine and/or monitoring, control and regulation of engines in operation. Mechanical behaviour such as twist of a crankshaft under load may be determined. Operational performance such as the IMEP value may be used in engine diagnostic and control methods to compare:
- work output in one cylinder with work output in other cylinders;
- work output according to different engine management settings for one or more cylinders such as valve timing, ignition timing, fuel injection timing;
- work output for different fuels.

Figure 4:
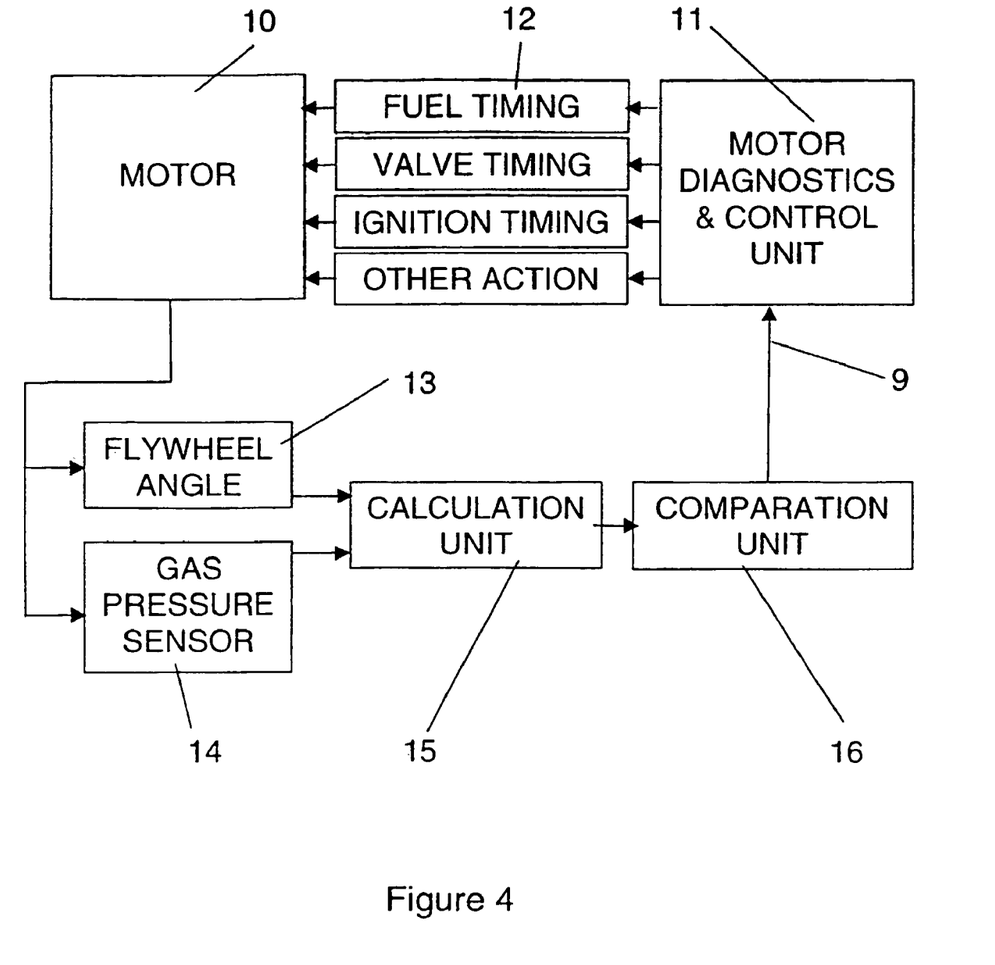
FIG. 4 shows a schematic diagram for system to control an engine using a method according to an embodiment of the invention.

FIG. 4 shows a schematic diagram for an exemplary arrangement of apparatus arranged in a system according to a further embodiment of the invention. The diagram shows a motor 10, a gas pressure sensor 14, a calculating unit 15, a comparation unit 16, and a motor diagnostics and control unit 11. A selection of some possible control actions for the motor are illustrated and shown as motor control actions 12.

The calculating unit 15 shown in FIG. 4 may be in one or more parts for calculation firstly of the offset value, and secondly for calculation of a value for work output, in particular IMEP. The IMEP value calculated is compared in comparation unit 16 which may be a separate component or not. Comparation unit 16 sends typically a signal 9 to a motor control unit 11 which may as a result issue one or more motor control actions 12 such as, for example, to change valve timing, fuel injection timing or ignition timing for one or more cylinders. The signal 9 may also be stored for analysis, data-logging or other purposes.

The calculated value for IMEP, based on operational measurements of cylinder gas pressure per cylinder or cylinders, is then compared to a predetermined value stored in a memory storage unit at 7. Such a memory storage device may be any commercially available device based on such as a ROM (Read Only Memory), a Programmable Read Only Memory (PROM), an Eraseable Programmable Read Only Memory (EPROM), in a flash memory, or in any other non-volatile or permanent storage. The comparison at 7 results in a value for IMEP being determined at 8 to either be within limits, Y, or outside of limits N. A compared IMEP that is out of limits with the stored value results in an error signal being sent at 9 to a control unit for the motor. This error signal may then be used in an action to regulate or otherwise adjust the motor.

As well as, or instead of, relatively fixed Y in-limits or N out-of-limits, the comparison results may be evaluated to show trends or changes in IMEP. Such changes or trends may be used to detect for example an increase in vibration, or of wear, or presence of carbonisation or other build-up that have a significance for engine performance, economy or service life.

A control action may be taken per cylinder or for multiples of cylinders. The control action is, typically and not exclusively, one or more of
- adjusting engine or cylinder ignition timing,
- adjusting fuel injection timing,
- adjusting fuel injection duration,
- adjusting valve timing.

For example in the case of electrical ignition engines burning fuels such as gasoline control actions may consist of adjusting fuel injection timing, fuel injection rate, fuel quantity, valve timing and/or compression ratio for engines with variable valve timing and/or compression ration, or a combination of actions. For example in the case of diesel engines control actions may consist of adjusting fuel injection timing, fuel quantity, or a combination of actions.

Calculation units 5, 6 and comparation unit 7 may be integrated in one or more electronic circuits. However one of more of these functions may equally be included as electronic circuits on boards or in chips according to the known techniques for making miniature control circuits. Furthermore, any function of the present invention such as for example the calculation units 5, 6 or comparator 7 may equally be implemented as software functions by computer program code, computer software or by one or more computer program elements, within a computer program in a computer, microprocessor or micro-chip connected to a motor or a control unit for a motor.

The signal generated by the comparator may take the form of a computer data signal embodied in a data communication. This data signal thus comprises information about the offset of crank angle of at least one cylinder of an internal combustion engine. The signal may also comprise a corresponding IMEP value. The signal may be communicated to a circuit in the same physical unit, circuit board or chip. The communication may as well by sent by comparator 7 or equivalent over a communication means to a separate control unit such as diagnostic and control unit 11. The communication means may comprise any communication device or communication network such as a simple wire connection, a cable network, a fieldbus, and a mixed network including a wireless link. In a generating plant or a ship for example the signal may be sent over a fieldbus. In a car the signal may be sent over a wire or a wireless connection. The data signal comprises information about a crank angle offset and/or IMEP, such that upon receipt of said signal a control action for the engine may be carried out in respect of said parameter. Examples of possible control actions such as fuel timing, valve timing etc. have been described above.

In another embodiment of the invention the method is carried out by computer program code portions contained in a computer software. A computer or microprocessor other means hereafter called a processor may be used to carry out steps of the method by means of one or more computer program code portions. The computer program code portions contains one or more formulae or algorithms according to the method of the present invention so that the offset between expected and actual position in a cylinder can be determined, an accurate value for IMEP etc calculated, and control actions taken dependent on the calculated value for IMEP. The computer code portions may be stored in or on any type of computer readable media, including as firmware in devices such as a chip, in a ROM (Read Only Memory), a Programmable Read Only Memory (PROM), an Eraseable Programmable Read Only Memory (EPROM), in a flash memory, or in any other non-volatile or permanent storage.

In a best use of the invention, and particularly for larger motors such as for ships and generators, a pressure sensor of the Cylmate (Trademark) type supplied by ABB is used. This type of pressure sensor is known to be accurate, have a long service life and to be affected to a very minimal extent by thermodynamic changes under engine operation.

In another and favourable embodiment the pressure signal is digitally sampled at known sample times. The derivative of the pressure signal is then computed with respect to time, which, if the rotational speed is constant, is proportional to the derivative with respect to the flywheel angle. The timing of the inflection points is computed for all cylinders where the pressure is measured in this way, and the timing is then used together with the known geometry of the crank shaft to estimate the flywheel position at the sample times. The estimation may be carried out by using an interpolation, such as linear interpolation, or by other known methods. This estimated flywheel position is then used to compute local crank angles for the pistons at the sample times, and used together with the sampled pressure signals to compute approximate values of variables for use as engine diagnostics, such as IMEP. By this means the embodiment provides a value for an offset without the need for a measurement of crankshaft angle such as by means of the flywheel angle.

It is also noted that while the above describes exemplifying embodiments of the invention, there are several variations and modifications which may be made to the disclosed solution without departing from the scope of the present invention as defined in the appended claims.

The invention claimed is:

1. A method to determine a top dead center position for a piston in a cylinder of an internal combustion engine comprising one or more cylinders and a crankshaft, the method comprising:
    measuring gas pressure in at least one cylinder as a function of an angular position of the crankshaft;
    measuring an inflection point of a curve based upon the measured gas pressure during a compression stroke;
    computing a theoretical value of the inflection point based upon engine characterizing parameters; and
    computing an angular position of the top dead center from a difference between the measured inflection point and the computed theoretical value of the inflection point.

2. The method according to claim 1, wherein the angular position of the crankshaft is obtained from an independent measurement of a flywheel angle.

3. The method according to claim 1, wherein the angular position of the crankshaft is obtained from an independent measurement of a flywheel angle taking twist of the crankshaft into account.

4. The method according to claim 3, wherein the twist is calculated using the measured gas pressure, reciprocating masses, and a stiffness of the crank shaft.

5. The method according to claim 4, further comprising:
    estimating a pressure for one or more cylinders of the engine in which pressure is not measured, wherein the estimated pressure is derived from pressure measured in at least one other cylinder, for use in the calculation of the twist.

6. The method according to claim 3, wherein the twist of the crankshaft is estimated taking into account the angular position of the crankshaft measured at both ends of the crankshaft.

7. The method according to claim 4, wherein said stiffness of the crankshaft is estimated based on offsets obtained with the engine running at different loads.

8. The method according to claim 1, wherein said theoretical value of the inflection point is obtained according to the formula:

$$a = -\sqrt{\frac{4}{(1+\lambda)(1+2(\gamma-0.0217))(r_c-1)} + \frac{\frac{4}{3}(-1-3\lambda+3\lambda^2)(5+4(\gamma-0.0217))}{(1+\lambda)^2(1+2(\gamma-0.0217))^3(r_c-1)^2}}$$

where
$\lambda$=Relation between crank radius and piston connecting rod length;
$\gamma$=Quotient between heat capacity at constant pressure and heat capacity at constant volume (polytropic coefficient) for the compressed gas at the estimated temperature of the gas at the inflection point;
$r_c$=Compression ratio of the motor;
α=theoretical inflexion point in radians.

9. The method according to claim 8, wherein the temperature dependence of said polytropic coefficient is taken into account by addition of a correction term.

10. The method according to claim 9, wherein said correction term is approximately equal to −0.0217.

11. The method according to claim 8, wherein said theoretical value for the inflection point is obtained by numerically solving a differential equation for the pressure as a function of the crank angle.

12. The method according to claim 1, further comprising:
calculating a value for diagnostic variables for the at least one cylinder, using said measured gas pressure, said crankshaft angle and an offset between the measured inflection point and the theoretical value of the inflection point.

13. The method according to claim 12, wherein said diagnostic variables include any of the following: Indicated Mean Effective Pressure, heat release, heat release rate, angle of maximum derivative, and angle of maximum pressure.

14. The method according to claim 12, further comprising:
comparing said diagnostic variables with a stored value.

15. The method according to claim 13, further comprising:
issuing a signal to a control unit of the engine dependent on any of said diagnostic variables.

16. A method to determine an approximate value of angular position as a function of time for a piston in a cylinder of an internal combustion engine comprising one or more cylinders and a crank shaft, the method comprising:
measuring a gas pressure in at least one cylinder as a function of time,
computing a timing of an inflection point of a curve based upon the measured gas pressure,
computing a theoretical value of the angular position of said piston at said inflection point, and
estimating a crank angle of said piston as a function of time, based on said inflection point timing and said theoretical value.

17. The method according to claim 16, wherein said estimate is based on interpolation between two of said timings.

18. The method according to claim 16, wherein said estimate is based on a least squares fit of a polynomial to more than two of said timings.

19. A system for determining TDC of piston in a cylinder of a motor, said system comprising:
a gas pressure sensor,
a calculation unit operative to calculate an inflection point of a pressure curve for gas pressure in the cylinder dependent on an angular position of a crankshaft, wherein the calculation unit comprises a formula to calculate a theoretical value for position of the piston according to the formula:

$$a = -$$

-continued $$\sqrt{\frac{4}{(1+\lambda)(1+2(\gamma-0.0217))(r_c-1)} + \frac{\frac{4}{3}(-1-3\lambda+3\lambda^2)(5+4(\gamma-0.0217))}{(1+\lambda)^2(1+2(\gamma-0.0217))^3(r_c-1)^2}}$$

λ=Relation between crank radius and piston connecting rod length;
γ=Quotient between heat capacity at constant pressure and heat capacity at constant volume (polytropic coefficient) for the compressed gas at the estimated temperature of the gas at the inflection point;
$r_c$=Compression ratio of the motor;
α=theoretical inflexion point in radians.

20. The system according to claim 19, wherein a unit of said system comprises a signal generator operative to generate a signal comprising a value for an offset.

21. The system according to claim 19, wherein a unit of said system comprises a signal generator operative to generate a signal comprising a value for work output.

22. The system according to claim 21, wherein the means to generate a signal comprising a value for work output comprises IMEP.

23. The system according to claim 19, wherein the calculation unit is operative to calculate an angular position of a piston in a cylinder of an internal combustion engine.

24. The system according to claim 19, wherein the calculation unit is operative to calculate a value for IMEP for a piston in a cylinder of an internal combustion engine.

25. A computer readable medium on which is stored a computer program product comprising computer code to instruct a computer or processor carry out the steps of
measuring gas pressure in at least one cylinder as a function of an angular position of the crankshaft;
measuring an inflection point of a curve based upon the measured gas pressure during a compression stroke;
computing a theoretical value of the inflection point based upon engine characterizing parameters; and
computing an angular position of the top dead center from a difference between the measured inflection point and the computed theoretical value of the inflection point.

26. The computer program product according to claim 25, wherein the computer code means will further cause the computer or processor to carry out the step of calculating an angular position of a piston in a cylinder of an internal combustion engine.

27. The computer program product according to claim 25, wherein the computer code means will further cause the computer or processor to carry out the step of calculating a value for IMEP for a cylinder of an internal combustion engine.

28. The computer program product according to claim 25, wherein the computer code means will further cause the computer or processor to carry out the step of generating a signal for a control action for control of an internal combustion engine.

29. A system for determining top dead center for a piston in a cylinder of an internal combustion engine comprising one or more cylinders and a crankshaft, said system comprising:
a gas pressure sensor operative to measure gas pressure in at least one cylinder as a function of an angular position of the crankshaft; and
a calculation unit operative to calculate an inflection point of a curve based upon the measured gas pressure during a compression stroke, to calculate a theoretical value of the inflection point based upon engine characterizing parameters, and to calculate an angular position of the top dead center from a difference between the measured inflection point and the computed theoretical value of the inflection point.

* * * * *